United States Patent [19]

Waynick

[11] Patent Number: 4,469,049

[45] Date of Patent: Sep. 4, 1984

[54] WATERING DEVICE

[76] Inventor: James Livingston Waynick, 906 S. Lindell Rd., Greensboro, N.C. 27403

[21] Appl. No.: 423,834

[22] Filed: Sep. 27, 1982

[51] Int. Cl.³ .............................................. A01K 7/06
[52] U.S. Cl. ...................................................... 119/76
[58] Field of Search .................................. 119/76, 75

[56] References Cited

U.S. PATENT DOCUMENTS

| 434,072 | 8/1890 | Quigley | 119/76 |
|---|---|---|---|
| 1,064,540 | 6/1913 | Rager | 239/24 |
| 1,069,233 | 8/1913 | Corey | 239/24 |
| 1,127,633 | 2/1915 | Kenney | 239/24 |
| 1,150,978 | 8/1915 | Thomas et al. | 239/24 |
| 1,157,122 | 10/1915 | Ralston | 239/24 |
| 1,212,537 | 1/1917 | Millen | 119/76 |
| 1,218,797 | 3/1917 | Murdock | 239/24 |
| 1,523,046 | 1/1925 | Berrien | 119/76 |
| 1,894,563 | 1/1933 | Jones | 239/24 |
| 2,612,138 | 9/1952 | Lindemann | 119/75 |
| 3,043,267 | 7/1962 | Blough | 119/75 |
| 3,044,446 | 7/1962 | Vanderhoven | 119/75 |
| 3,262,424 | 7/1966 | Hjalmarsson | 119/75 |
| 3,381,667 | 5/1968 | Martin | 119/75 |

Primary Examiner—Hugh R. Chamblee

[57] ABSTRACT

The invention presented herein comprises an animal-activated watering device which is designed to maintain a high standard of sanitation. The device includes a reservoir for holding drinking water for the animal which is totally drained after the animal's use. The reservoir may be constructed of stainless steel or other smooth materials which allow the reservoir to completely drain thus preventing stagnant or contaminated water from being available for drinking by the animal.

5 Claims, 3 Drawing Figures

WATERING DEVICE

BACKGROUND AND OBJECTIVES OF THE INVENTION

Pet owners, animal breeders and the like have used a variety of "animal activated" watering devices in the past in an effort to provide fresh water for drinking. Various prior art devices have included constructions which attempt to prevent water from becoming contaminated or polluted in various ways. Self-draining devices have also been constructed in the past but, due to their construction or due to their reusage of the water, none of these devices have proved entirely satisfactory and it is one objective of the present invention to provide an animal activated watering device which provides fresh, bacteria-free water for an animal and which is totally drainable after the animal's use.

Another objective of the present invention is to provide a sanitary watering device which is constructed with a smooth inner wall which will quickly and easily drain.

It is still another objective of the present invention to provide a watering device that is easily activated by an animal which will not frighten or scare the animal during its use.

It is another objective of the present invention to provide a watering device which is relatively easy to construct and inexpensive to manufacture.

Yet another objective of the invention is to provide a watering device including a reservoir, a slanted shelf and a lip to help prevent water from sloshing out, onto the surrounding floor or ground.

Another objective of the present invention is to provide a watering device which is easily cleaned and is adaptable to indoor or outdoor use.

Various other advantages and objectives of the present invention will be apparent as explained in more detail below.

SUMMARY OF THE INVENTION AND DESCRIPTION OF THE PREFERRED EMBODIMENT

The present invention demonstrates a device whereby animals such as household pets can obtain fresh drinking water as needed. The device may be used indoors or outdoors and is joined to a supply of fresh water and a cut-off valve allows for regulating the flow of the incoming water to prevent overflowing whereby the animal upon standing or resting on a pressure plate will activate a valve which will allow fresh water to flow into an open reservoir. The reservoir is essentially bowl-shaped and a series of apertures for draining are located at the bottom of the reservoir. Along the upper portion of the reservoir is a second outlet which is larger in diameter than said first outlet and acts as an overflow port. Above the reservoir is a shelf means which joins the top of said reservoir. The slanted shelf is connected to a lip, and the shelf and lip prevent spillage during use. After the animal using the watering device has removed himself from the pressure plate the water remaining in said reservoir is then drained and the smooth inner walls of said reservoir allow for total drainage whereby said reservoir is dry and remains virtually bacteria free.

The preferred embodiment of the device comprises a reservoir constructed of stainless steel and has a stainless steel pressure plate. Said pressure plate is positioned on top of four columns of said column includes coil springs or suitable tension depending on the size of the animal or animals to use said watering device. Said pressure plate contacts a valve and by depressing the pressure plate the valve opens to allow water to flow into a reservoir. The watering device is connected to a water supply line and a valve allows fresh water to flow through a supply tube which slopes downwardly from said valve to an inlet positioned in said reservoir. A first outlet for draining said reservoir is positioned at the bottom of the reservoir and a larger second outlet is positioned near the top of said reservoir and acts as an overflow relief. Said pressure plate is spaced from said reservoir to assist in periodic cleaning as required.

Said reservoir is constructed of a smooth, polished stainless steel which allows total drainage of said reservoir at the conclusion of its use. The total drainage feature provides a bacteria-free, sanitary device which reduces the possibility of the users, which may be household pets, from becoming ill or dehydrated from a lack of a good clean water source.

DETAILED DESCRIPTION OF THE DRAWINGS

Figure 1:
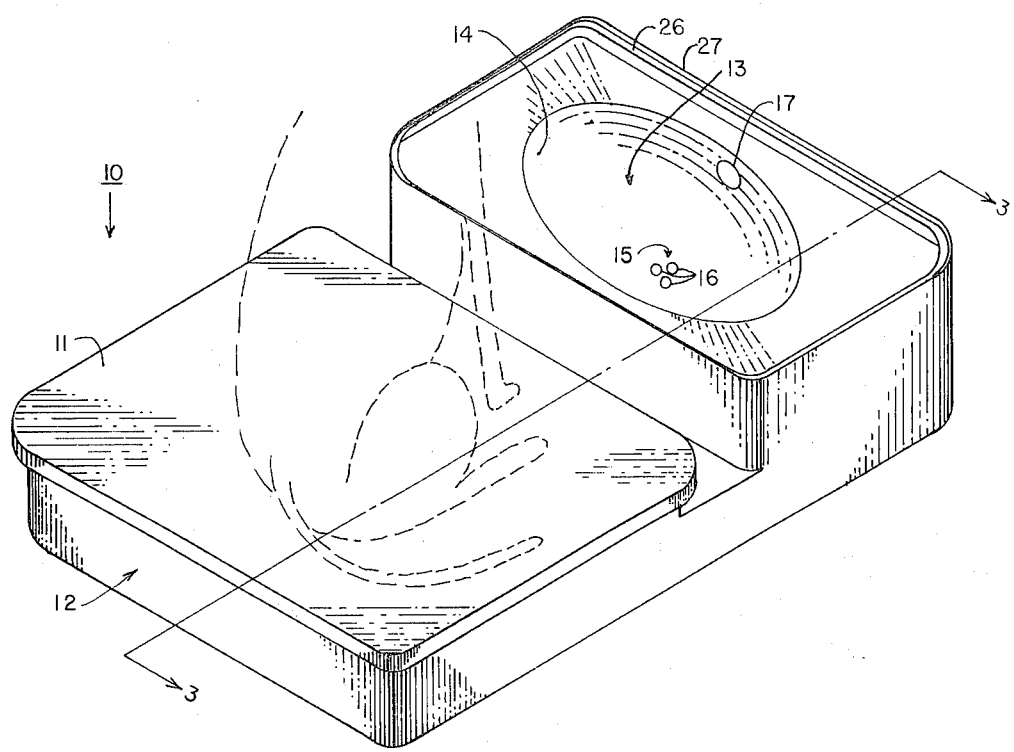
Figure 2:
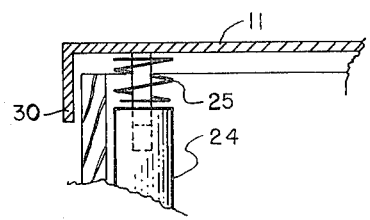

For a more detailed description of the drawings,

FIG. 1 demonstrates a perspective view of the watering device;

FIG. 2 illustrates in cut-away fashion the mounting of the pressure plate; and

Figure 3:
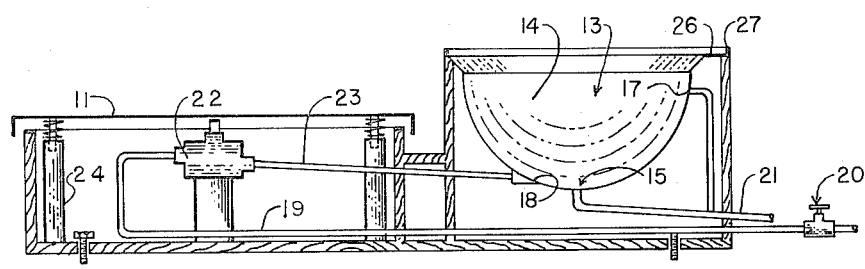

FIG. 3 demonstrates a cross-sectional view of the device along lines 3—3 of FIG. 1.

Water device 10 as shown in FIG. 1 includes pressure plate 11 which is resiliently mounted atop base 12. Reservoir 13 may for example be constructed of stainless steel and includes smooth, inner wall 14. First outlet 15 is shown at the bottom of reservoir 13 and includes a series of apertures 16 through which water contained in reservoir 13 will drain. A removable drain strainer may under certain circumstances be desirable. Near the top of inner wall 14 is positioned second outlet 17 which has a total diameter greater than first outlet 15. Inlet 18 has a diameter smaller than second outlet 17 to prevent any overflow from reservoir 13 should pressure plate 11 be depressed for an extended period of time.

Water supply line 19 is also shown in FIG. 1 with cut-off valve 20 for adjusting the flow rate of the incoming water. A conventional pressure regulating valve may be installed in water supply line 19 if necessary to provide a proper water pressure on valve 22. Drain line 21 as shown may be connected to a sewer line as required for drainage purposes. In operation, an animal such as a cat or dog may sit or stand on a pressure plate 11 causing activation of pressure operated valve 22 which is conventionally available with various pressure-operated ratings as shown in FIG. 3. As valve 22 opens water is allowed to flow downwardly through supply tube 23 and through inlet means 18 of reservoir 13. The animal then has an opportunity to drink water which is contained within reservoir 13. Upon leaving, first outlet 15, which remains open, allows the unused water to drain out. Supply tube 23 slopes downwardly towards reservoir 13 whereby any water which passes through valve 22 drains into reservoir 13 and out first outlet 15. As shown, inner walls 14 of reservoir 13 are smooth and prevent the collection of water or dirt which would promote bacteria growth. Thus, as shown the water delivered to reservoir 13 is under constant motion and does not become stagnant with pollutants or bacteria such as may be received from the animal using the watering device and is drained away and thus cannot contribute to unsanitary conditions.

FIG. 2 demonstrates the resilient mounting of pressure plate 11 having a downwardly depending flange 30. As shown columns 24 have resilient coil springs 25 thereon which contact pressure plate 11 and hold it in position. It may be desirable under certain conditions to have additional column 24 on each side of valve 22 to provide extra support for pressure plate 11 for use with large animals. In the event a pet owner wanted to use watering device 10 for a heavier animal such as a large dog, then heavier spring members 25 could be selected and installed. Conversely, if a smaller pet such as a small cat were to use the watering device 10, smaller, less rigid spring members 25 would be used. Farm animals, household pets, and other animals can benefit from watering device 10 with adjustments made thereto to accomodate their size and water requirements.

Above reservoir means 3 is located a shelf means 26 which joins the upper edge of reservoir 13. Lip 27 as shown in FIG. 3 joins shelf 26 and lip 27 and shelf 26 prevents excess spillage as for example when an animal quickly moves away from watering device 10 after drinking.

Various modifications and changes could be made to the invention and the illustrations and examples presented herein are for illustrative purposes and not intended to limit its scope.

I claim:

1. A sanitary watering device to provide fresh running water which is constantly draining and which is animal activated comprising: a reservoir, an inlet, said inlet communicating with said reservoir, a pressure operated valve, a pressure-plate, said pressure-plate contacting said valve, resilient support means, said support means contacting said pressure-plate, said valve communicating with said inlet through an inlet supply tube, said supply tube sloping downwardly from said valve to said inlet, a first outlet, said first outlet communicating with said reservoir, a second oulet, said second outlet positioned above said first oulet and having a greater diameter than said first outlet, said second outlet communicating with said reservoir, said reservoir having an inner wall with a smooth, totally drainable surface, a shelf, said shelf joined to said reservoir, a lip, said lip joined to said shelf whereby unused water entering said reservoir will constantly drain through said first outlet and said reservoir will be dry and virtually bacteria free upon draining.

2. A sanitary watering device as claimed in claim 1 wherein said pressure plate has a downwardly depending flange.

3. A sanitary watering device as claimed in claim 1 wherein said pressure plate is positioned over said pressure operated valve.

4. A sanitary watering device as claimed in claim 1 wherein said pressure plate is spaced from said reservoir to assist in cleaning.

5. A sanitary watering device as claimed in claim 1 and including a cut-off valve, said cut-off valve for adjusting the flow rate of the incoming water.

* * * * *